United States Patent
Alonso-Miralles (10) Patent No.: US 9,783,316 B2
(45) Date of Patent: Oct. 10, 2017

(54) ACOUSTIC PANEL ASSEMBLY WITH A FOLDING CHAMBER

(71) Applicant: Rohr, Inc., Chula Vista, CA (US)

(72) Inventor: Jose S. Alonso-Miralles, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 14/746,345

(22) Filed: Jun. 22, 2015

(65) Prior Publication Data
US 2016/0368615 A1 Dec. 22, 2016

(51) Int. Cl.
| | |
|---|---|
| G10K 11/172 | (2006.01) |
| F02K 1/82 | (2006.01) |
| F02C 7/045 | (2006.01) |
| F02K 1/34 | (2006.01) |
| G10K 11/16 | (2006.01) |
| F02K 1/78 | (2006.01) |
| F02C 7/04 | (2006.01) |
| G10K 11/168 | (2006.01) |

(52) U.S. Cl.
CPC ............ B64D 33/06 (2013.01); G10K 11/168 (2013.01)

(58) Field of Classification Search
CPC .... F02K 1/827; F02K 1/82; F02C 7/24; F02C 7/045; B64D 2033/0206; B64D 2033/0273
USPC ....... 181/292, 288, 214, 213; 244/53 B, 119, 244/123.13
See application file for complete search history.

(56) References Cited

U.S. PATENT DOCUMENTS

| | | | | |
|---|---|---|---|---|
| 4,106,587 | A * | 8/1978 | Nash .................... | G10K 11/172 181/213 |
| 4,122,672 | A | 10/1978 | Lowrie | |
| 4,531,362 | A * | 7/1985 | Barry ..................... | F01D 25/06 415/119 |
| 4,645,032 | A * | 2/1987 | Ross ........................ | F02C 7/24 181/224 |
| 5,618,363 | A * | 4/1997 | Mullender .............. | B29C 33/52 156/155 |
| 6,122,892 | A * | 9/2000 | Gonidec .................. | B32B 3/12 428/116 |
| 7,337,875 | B2 * | 3/2008 | Proscia ................... | F02C 7/045 181/210 |
| 7,401,682 | B2 * | 7/2008 | Proscia ................... | F02K 1/827 181/214 |

(Continued)

FOREIGN PATENT DOCUMENTS

| | | | | |
|---|---|---|---|---|
| DE | 102012001571 A1 * | 8/2013 | ............... | F02K 3/06 |
| EP | 888606 | 11/2001 | | |

*Primary Examiner* — Edgardo San Martin
(74) *Attorney, Agent, or Firm* — O'Shea Getz P.C.

(57) ABSTRACT

An acoustic panel structure includes a perforated front sheet, a back sheet and a porous core between the front sheet and the back sheet. The acoustic panel structure also includes a non-perforated back cover which overlaps a portion of the back sheet. A portion of the back sheet is perforated and another portion of the back sheet is not perforated. An acoustic chamber is formed at least in part by the space between the back sheet and the back cover. The acoustic chamber may also be formed in part by the space between the front sheet and back cover. The space between the back sheet and the back cover is generally elongated in the x-y direction of the acoustic panel structure. This relatively thin acoustic panel structure is configured to attenuate long wavelength and low frequency noise.

18 Claims, 8 Drawing Sheets

(56) References Cited

U.S. PATENT DOCUMENTS

| | | | |
|---|---|---|---|
| 7,857,093 B2 | 12/2010 | Sternberger et al. | |
| 7,870,929 B2 * | 1/2011 | Farstad | F02C 7/045 |
| | | | 181/214 |
| 8,490,744 B2 * | 7/2013 | Nakamura | F01D 9/023 |
| | | | 181/212 |
| 8,567,558 B2 * | 10/2013 | Nakajima | E04B 1/86 |
| | | | 181/210 |
| 8,727,707 B2 | 5/2014 | Schwaller | |
| 8,733,496 B2 * | 5/2014 | Ono | F02C 7/24 |
| | | | 181/213 |
| 8,931,588 B2 | 1/2015 | Murray | |
| 9,097,179 B2 * | 8/2015 | Brooks | F01D 5/26 |
| 2006/0169533 A1 * | 8/2006 | Patrick | B64D 33/02 |
| | | | 181/210 |
| 2012/0160933 A1 * | 6/2012 | Vauchel | F02K 1/827 |
| | | | 239/265.11 |
| 2013/0142624 A1 * | 6/2013 | Julliard | F02C 7/24 |
| | | | 415/119 |
| 2014/0064928 A1 * | 3/2014 | Todorovic | F02K 3/06 |
| | | | 415/119 |
| 2014/0326536 A1 | 11/2014 | Vauchel et al. | |
| 2015/0037135 A1 * | 2/2015 | Kempton | B64D 33/02 |
| | | | 415/1 |
| 2016/0076453 A1 * | 3/2016 | Richter | B64D 33/02 |
| | | | 181/286 |

* cited by examiner

ACOUSTIC PANEL ASSEMBLY WITH A FOLDING CHAMBER

BACKGROUND OF THE INVENTION

1. Technical Field

This disclosure relates generally to noise attenuation for an aircraft propulsion system.

2. Background Information

A propulsion system for an aircraft produces varying amounts of audible noise during operation. One or more acoustic panels may be configured with the propulsion system to attenuate and reduce this noise. As a general rule with known technology, relatively thin acoustic panels are utilized to attenuate noise with relatively short wavelengths and high frequencies, whereas relatively thick acoustic panels are utilized to attenuate noise with relatively long wavelengths. However, as noise wavelengths lengthen as a byproduct of new engine designs while space allocation for sound attenuation structures decreases, traditional acoustic panel configurations may not fulfill all their requirements. There is a need in the art for an improved sound attenuation structure for an aircraft propulsion system that attenuates longer wavelength, low frequency noise without being excessively thick.

SUMMARY OF THE DISCLOSURE

According to an aspect of the present disclosure, an acoustic panel structure is provided for an aircraft propulsion system. This acoustic panel structure includes a first sheet, a second sheet, a core and a third sheet. The first sheet is configured with a first perforated region and a first non-perforated region. The second sheet is configured with a second perforated region. The core is configured with a plurality of cavities between the first perforated region and the second perforated region. The third sheet is configured to form a chamber bounded by the second perforated region and the first non-perforated region.

According to another aspect of the present disclosure, an assembly is provided for an aircraft propulsion system. This assembly includes an acoustic panel configured with a plurality of cavities fluidly coupled and vertically (e.g., radially) between a plurality of first perforations and a plurality of second perforations. The assembly also includes a back sheet connected to the acoustic panel. A chamber is between the acoustic panel and the back sheet, and wherein the chamber vertically (e.g., radially) overlaps the acoustic panel.

The acoustic panel may be a composite bond panel.

A nacelle may be included for the aircraft propulsion system. The nacelle may include the acoustic panel and the back sheet.

An inner fixed structure may be included for the aircraft propulsion system. The inner fixed structure may include the acoustic panel and the back sheet.

The core may be radially between the first sheet and the second sheet. The chamber may radially overlap the core.

The core may be radially between the first sheet and the second sheet. A portion of the chamber may be radially aligned with the core.

The core may be radially between the first sheet and the second sheet. A portion of the chamber may be circumferentially next to the core.

The core may be vertically between the first sheet and the second sheet. A portion of the chamber may be axially next to the core.

The second sheet may be configured with a second non-perforated region. The core may be configured with a plurality of second cavities between the first perforated region and the second non-perforated region.

The core may be connected between the first sheet and the second sheet, and the third sheet is connected to the first sheet and the second sheet.

The core may be bonded to the first sheet and the second sheet.

The third sheet may be bonded to the first sheet and/or the second sheet. The third sheet may also or alternatively be mechanically fastened to the first sheet and/or the second sheet.

A first portion of the chamber may be fluidly coupled with a second portion of the chamber with at least some of the cavities. A radial thickness of the first portion of the chamber may be less than a radial thickness of the second portion of the chamber.

The foregoing features and the operation of the invention will become more apparent in light of the following description and the accompanying drawings.

DETAILED DESCRIPTION OF THE INVENTION

Figure 1:
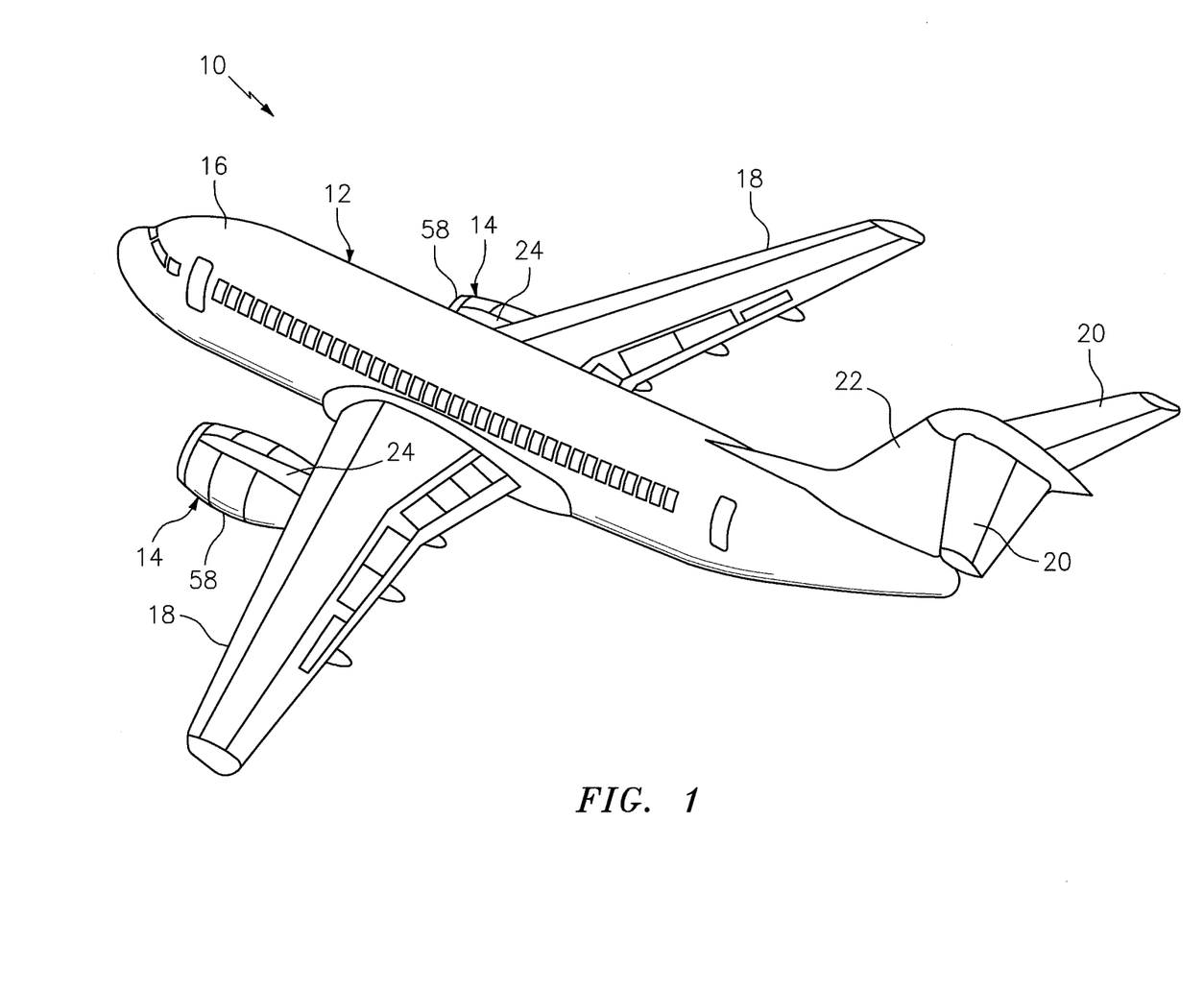
FIG. 1 is a perspective illustration of an aircraft according to an embodiment of the present disclosure.

FIG. 1 illustrates an aircraft 10 configured as an airplane or jet plane. This aircraft 10 includes an airframe 12 and a plurality of aircraft propulsion systems 14.

The airframe 12 includes a fuselage 16 and a plurality of wings 18 and 20. The wings include main or general lift wings 18 and stabilizer wings 20. The wings 18 are disposed on and connected to opposing sides of the fuselage 16. The wings 20 are disposed on and connected to opposing sides of a tail 22, which extends out from an aft portion of the fuselage 16. The present disclosure, however, is not limited to the foregoing exemplary airframe configuration.

Each of the propulsion systems 14 is mounted to a respective one of the wings 18 by a pylon 24. Of course, in other embodiments, one or more of the propulsion systems 14 may each be mounted by its pylon 24 to another component of the airframe 12 such as, for example, the wing 20, the fuselage 16, etc.

Figure 2:
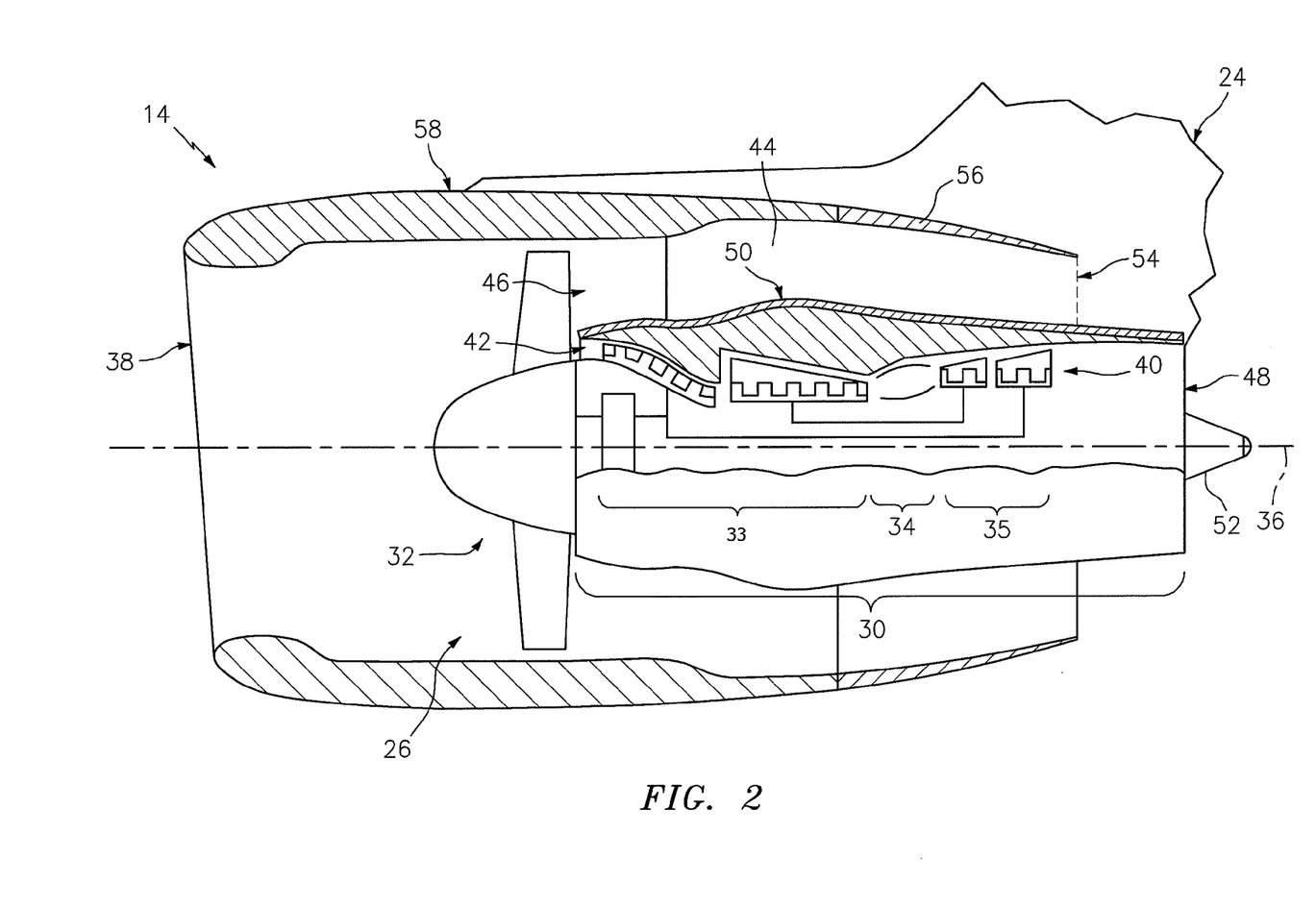
FIG. 2 is a side cutaway illustration of a propulsion system for the aircraft.

Referring to FIG. 2, each of the propulsion systems 14 may be configured as a turbofan propulsion system. The present disclosure, however, is not limited to any particular type of aircraft propulsion system. For example, each propulsion system 14 may alternatively be configured as a turbojet propulsion system.

The propulsion system 14 of FIG. 2 includes a turbofan turbine engine 26 housed within an aerodynamic nacelle 58 and inner fixed structure 50 ("IFS"). The turbine engine 26 includes a turbine engine core 30 and a fan section 32. The engine core 30 includes a compressor section 33, a combustor section 34 and a turbine section 35. The engine sections 32-35 are arranged sequentially along an axial centerline 36 of the turbine engine 26 within the nacelle 58 and the inner fixed structure 50. The compressor section 33 includes a low pressure compressor (LPC) section and a high pressure compressor (HPC) section. The turbine section 35 includes a high pressure turbine (HPT) section and a low pressure turbine (LPT) section.

During operation, air enters the turbine engine 26 through an airflow inlet 38. This air is directed through the fan section 32 and into (i) a core gas path 40 through a core inlet 42 and into (ii) a bypass gas path 44 through a bypass inlet 46. The core gas path 40 extends sequentially through the engine sections 33-35 to a core exhaust nozzle 48. The bypass gas path 44 circumscribes the engine core 30. The bypass gas path 44 extends axially to a bypass exhaust nozzle 54, which is formed radially between an aft outer bypass structure 56 (e.g., a translating sleeve) of a nacelle 58 (e.g., fan nacelle) and the inner fixed structure 50. The air within the core gas path 40 may be referred to as "core air". The air within the bypass gas path 44 may be referred to as "bypass air".

The core air is compressed by rotors in the compressor section 33 and directed into a combustion chamber of a combustor in the combustor section 34. Fuel is injected into the combustion chamber and mixed with the compressed core air to provide a fuel-air mixture. This fuel air mixture is ignited and combustion products thereof (hereinafter "core gas") flow through and sequentially cause the rotors in the turbine section 35 to rotate. The rotation of the turbine section 35 rotors respectively drive rotation of the compressor section 33 rotors and, thus, compression of the air received from the core inlet 42. The rotation of the turbine section 35 rotor also drives rotation of a rotor in the fan section 32, which propels bypass air through and out of the bypass gas path 44 through the bypass exhaust nozzle 54. The propulsion of the bypass air may account for a majority of thrust generated by the turbine engine 26, e.g., more than seventy-five percent (75%) of engine thrust. The turbine engine 26 of the present disclosure, however, is not limited to the foregoing exemplary thrust ratio.

The nacelle 58 extends axially along the centerline 36 between the airflow inlet 38 and the bypass exhaust nozzle 54. The nacelle 58 extends circumferentially around and houses the fan section 32. The inner fixed structure 50 extends axially along the centerline 36 between the inlets 42 and 46 and the core exhaust nozzle 48. The inner fixed structure 50 extends circumferentially around and houses the engine sections 33-35; e.g., the engine core 30. A forward portion of the inner fixed structure 50 is axially aligned with and arranged radially within an aft portion of the nacelle 58, thereby forming at least a portion of the bypass gas path 44 as well as its inlet 46 and exhaust nozzle 54 radially between the components 50 and 58.

Figure 3:
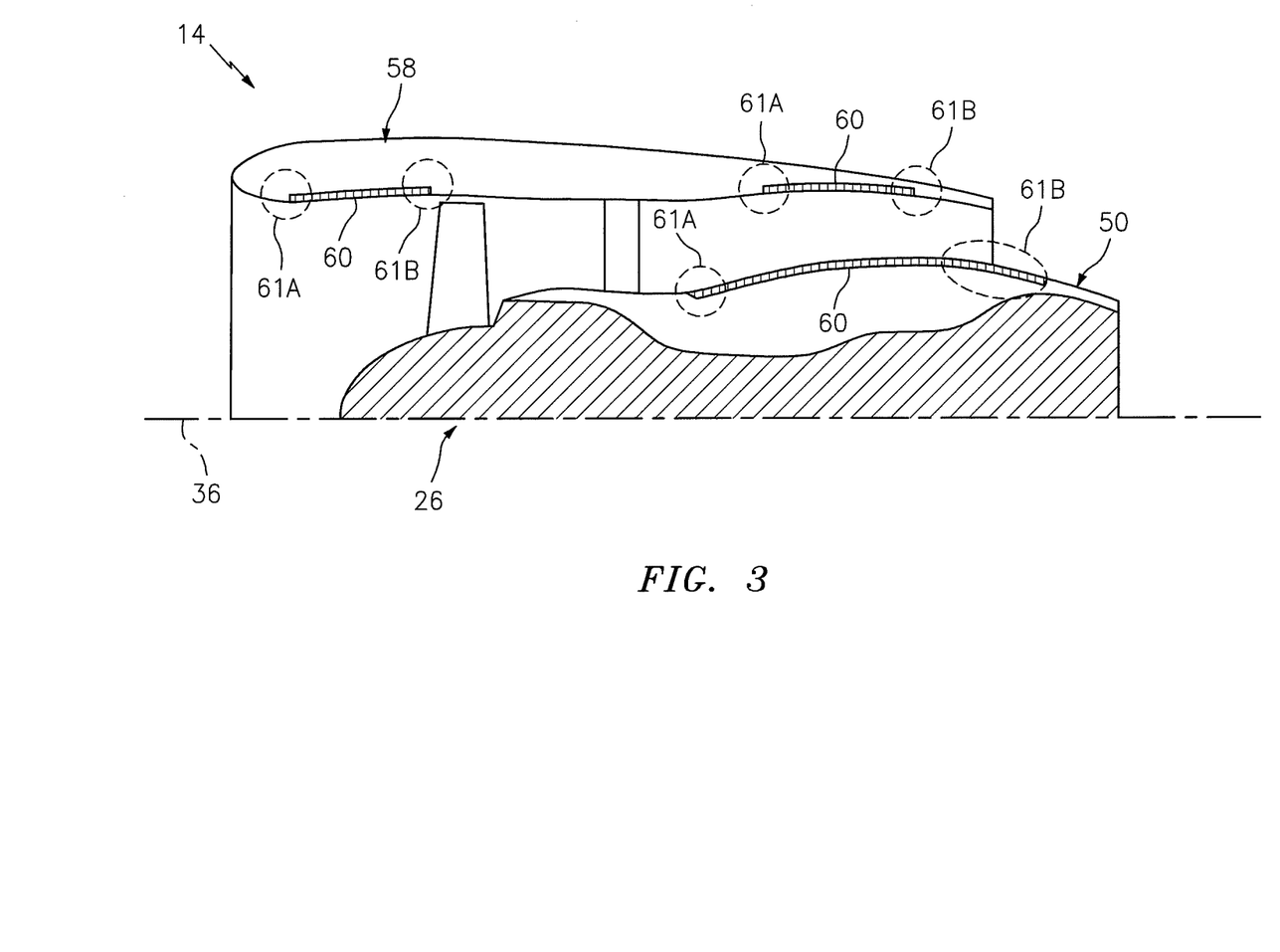
FIG. 3 is a partial, side sectional block diagram illustration of another propulsion system for the aircraft.

Referring now to FIG. 3, possible locations or positions for an inventive folding acoustic panel structure 60 are shown. The acoustic panel structure 60 includes at least one folding chamber. This folding chamber may be configured at (e.g., on, adjacent or proximate) a leading edge 61A of the acoustic panel structure 60. The folding chamber may be configured at a trailing edge 61B of the acoustic panel structure 60. In addition or alternatively, the folding chamber may be configured at a lateral (e.g., circumferential) side of the acoustic panel structure 60.

Figure 4:
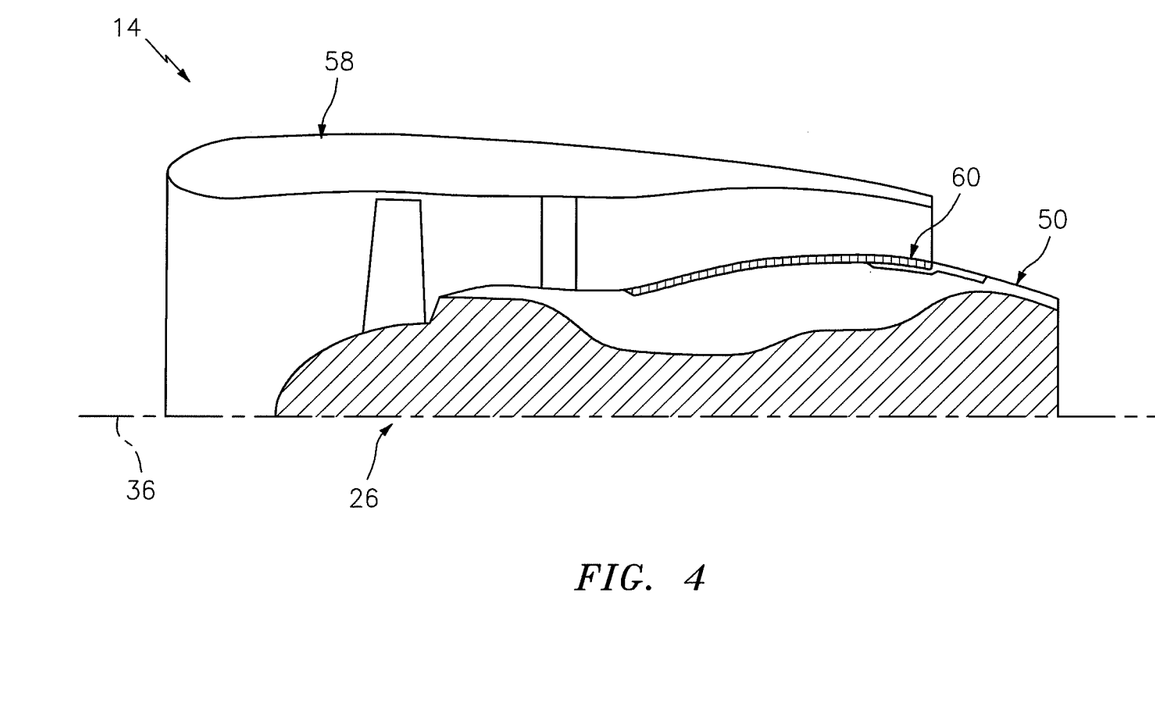
FIG. 4 is a partial, side sectional block diagram illustration of another propulsion system for the aircraft.

An exemplary embodiment of an acoustic panel structure 60 with a folding chamber configuration is illustrated in FIG. 4. While this acoustic panel structure 60 is illustrated as being configured with the inner fixed structure 50, such an acoustic panel structure may also or alternatively be configured with the nacelle 58; e.g., in an inner barrel, in the outer bypass structure 56, in a blocker door of a thrust reverser, etc. Such an acoustic panel structure, of course, may also provide noise attenuating benefits to other portions of the aircraft 10 as well.

Figure 5:
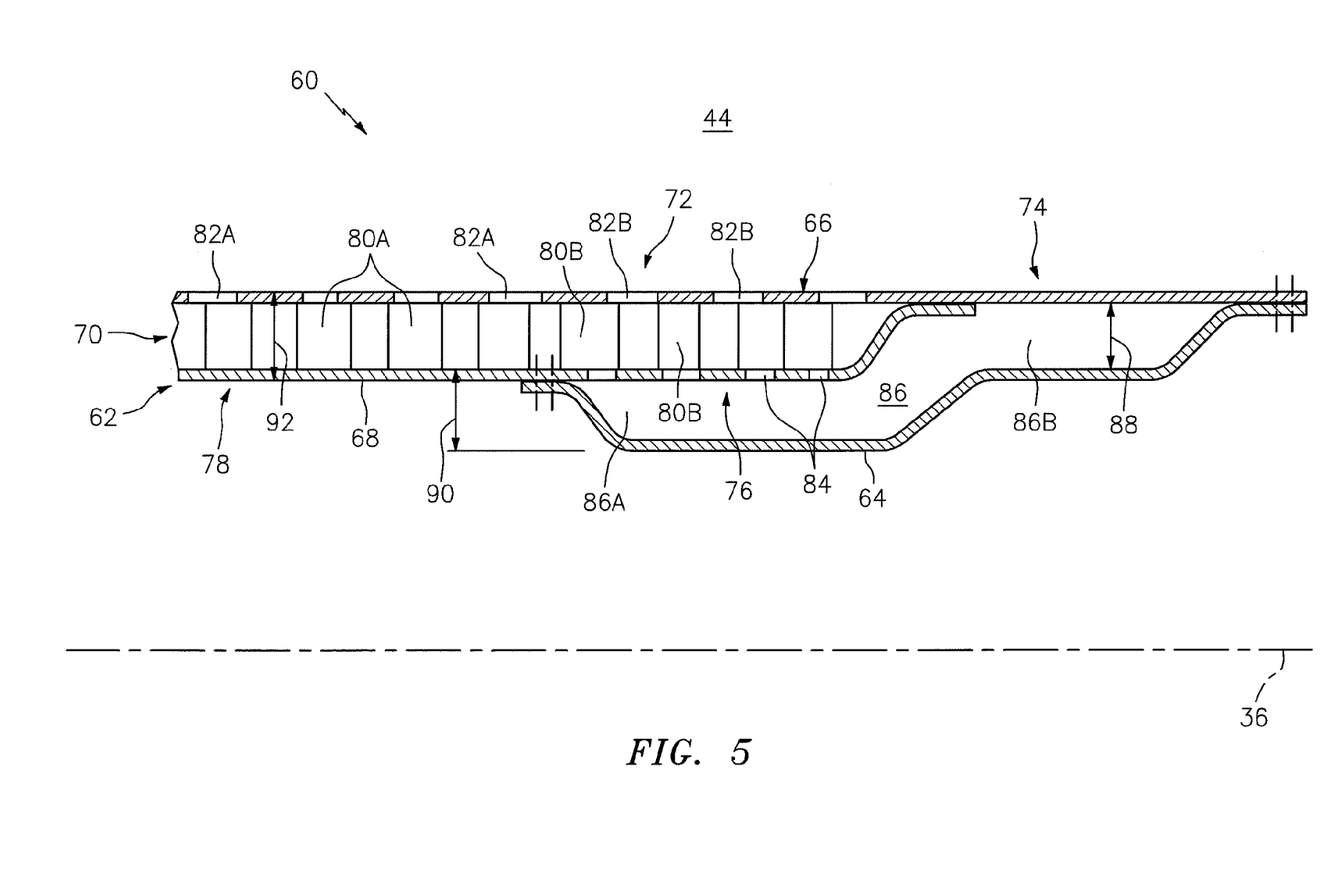
FIG. 5 is a partial, side sectional illustration of an acoustic panel structure for the propulsion system of FIGS. 3-5.

Referring to FIG. 5 (see also FIGS. 6 and 7), the acoustic panel structure 60 includes a perforated front sheet 66, a back sheet 68 and a porous core 70 between the front sheet 66 and the back sheet 68 to form an acoustic panel 62. The acoustic panel structure 60 also includes a non-perforated back cover/sheet 64 which overlaps a portion of the back sheet 68. A portion 76 of the back sheet 68 is perforated and another (e.g., remaining) portion 78 of the back sheet 68 is not perforated. An acoustic chamber 86 is formed at least in part (portion 86A) by the space between the back sheet 68 and the back cover 64. The acoustic chamber 86 may also be formed in part (portion 86B) by the space between the front sheet 66 and back cover 64. The space (portion 86A) between the back sheet 68 and the back cover 64 is generally elongated in the x-y direction of the acoustic panel structure 60.

The core 70 may be configured as a honeycomb core, and includes a plurality of cavities 80 (or pores). The core 70 is positioned radially between and may be directly or indirectly connected (e.g., mechanically fastened, welded, brazed, adhered and/or otherwise affixed) to the front sheet 66 and the back sheet 68. A first set of the cavities 80A are arranged radially between the perforated region 72 and the non-perforated region 78. In this manner, those cavities 80A are only fluidly coupled with perforations 82A in the front sheet 66. A second set of the cavities 80B are arranged radially between the perforated region 72 and the perforated region 76. In this manner, those cavities 80B are fluidly coupled and extend radially between perforations 82B in the front sheet 66 and perforations 84 in the back sheet 68.

Figure 6:
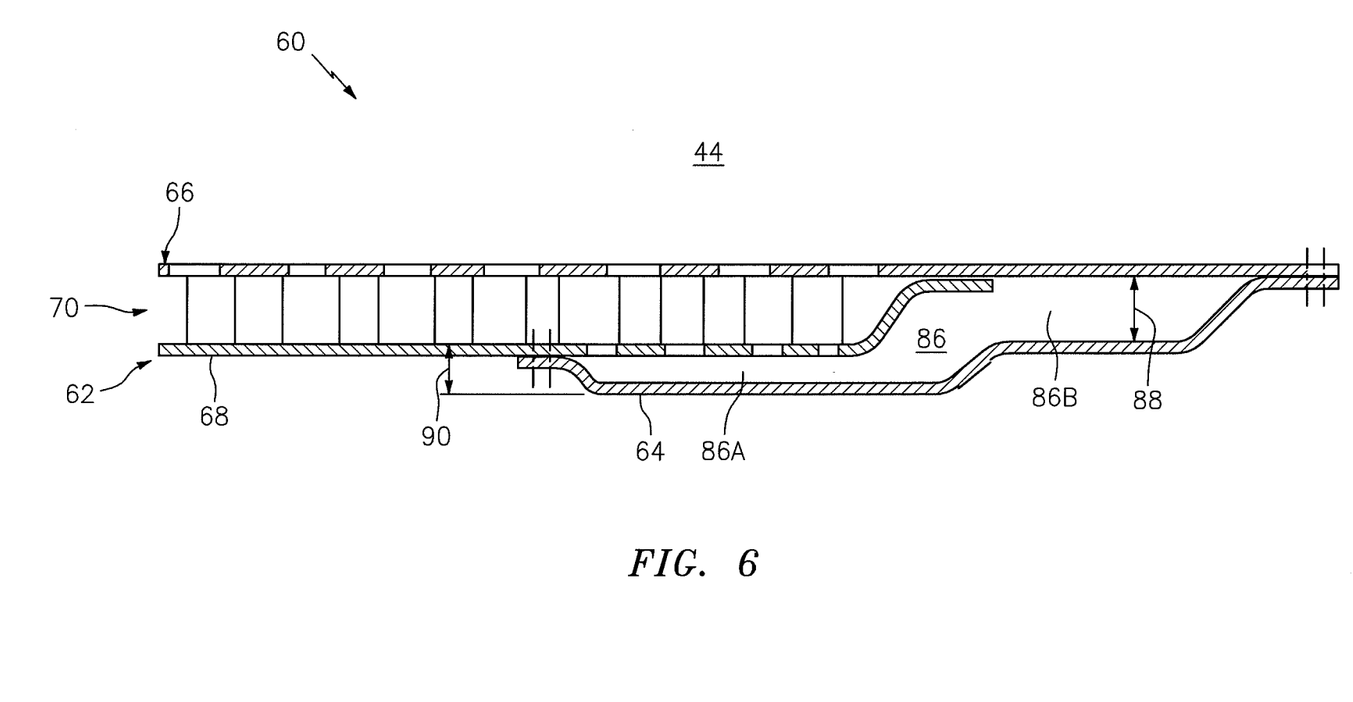
FIG. 6 is a partial, side sectional illustration of another acoustic panel structure for the propulsion system of FIGS. 3-5.
Figure 7:
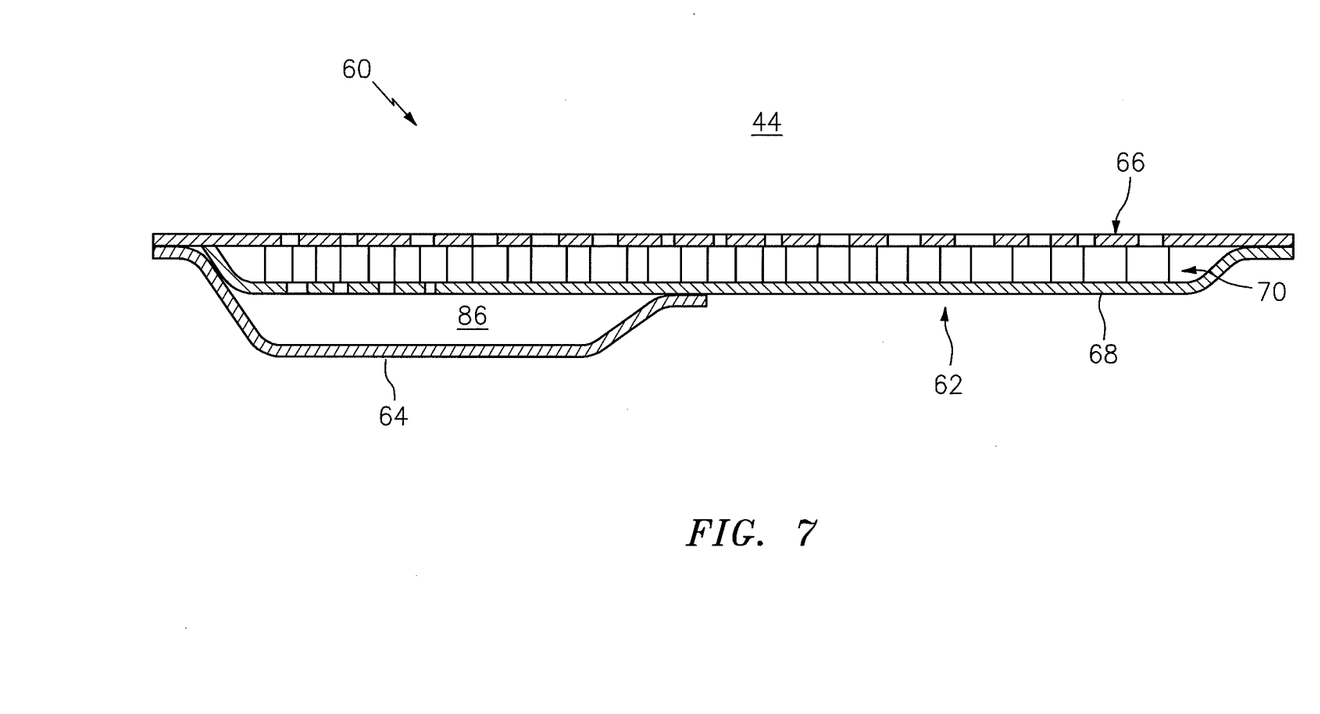
FIG. 7 is a partial, side sectional illustration of still another acoustic panel structure for the propulsion system of FIGS. 3-5.

The acoustic panel 62 is shown in FIGS. 5-7 as a single degree-of-freedom (SDoF) acoustic panel. However, in alternative embodiments, the acoustic panel 62 may alternatively be configured as a double degree-of-freedom (DDoF) acoustic panel or any other type of acoustic panel.

Referring still to FIG. 5, the back cover 64 axially and circumferentially overlaps the front sheet 66 and the back sheet 68. The back cover 64 may also radially overlap the core 70 and, thus, the acoustic panel 62. More particular, the back cover 64 of FIG. 5 is connected (e.g., mechanically fastened, welded, brazed, adhered and/or otherwise affixed) to the back sheet 68. The back cover 64 of FIG. 5 is also connected (e.g., mechanically fastened, welded, brazed, adhered and/or otherwise affixed) to the front sheet 66. While the connections between the back cover 64 and the acoustic panel 62 are shown as direct connections, one or more of these connections may alternatively be indirect connections through an intermediate components in other embodiments.

As set forth above, at least one chamber 86 is formed radially between the acoustic panel 62 and the back cover 64. The first region 86A of the chamber 86 of FIG. 5 is formed and extends radially between the perforated region 76 and the back cover 64. This first region 86A of the chamber 86 is fluidly coupled with at least some of the cavities 80B through at least some of the perforations 84 in the back sheet 68. The second region 86B of the chamber 86 of FIG. 5 is formed and extends radially between the non-perforated region 74 and the back cover 64. This second region 86B of the chamber 86 is fluidly coupled with the respective cavities 80B through the first region 86A of the chamber 86.

The second region 86B of the chamber 86 may have a radial thickness 88 that is approximately equal to a radial thickness 90 of the first region 86A of the chamber 86. However, the radial thickness 88 may alternatively be different than the radial thickness 90. For example, referring to FIG. 6, the radial thickness 88 may be greater than the radial thickness 90 which thereby configures this region 86A of the chamber 86 into a throat or constriction to the second region 86B of the chamber 86. Such a throat or constriction may tune the chamber 86 to attenuate sound waves with longer wavelengths. The radial thickness 88 may also be approximately equal to (or less or thicker than) a radial thickness 92 of the core 70 or the acoustic panel 62.

Figure 8:
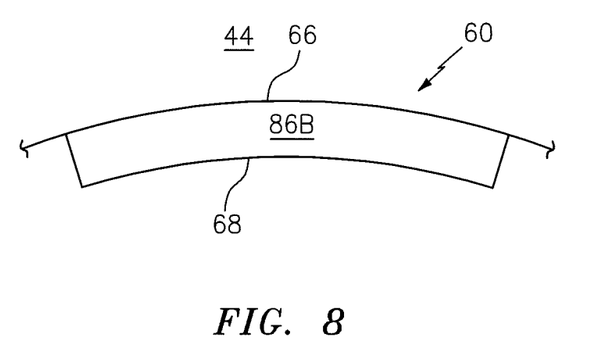
FIG. 8 is a partial cross sectional illustration of an acoustic panel structure for the propulsion system of FIGS. 3-5.
Figure 9:
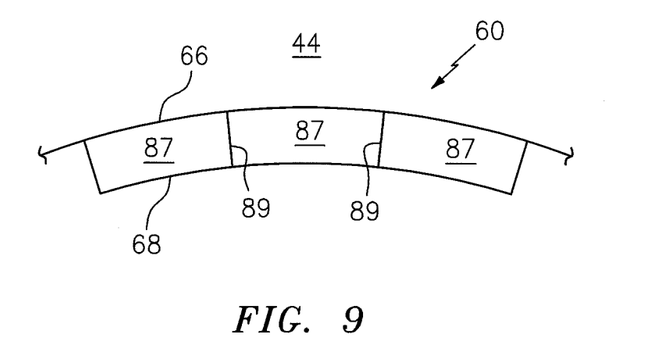
FIG. 9 is a partial cross sectional illustration of another acoustic panel structure for the propulsion system of FIGS. 3-5.

The chamber 86 may be configured as a single open chamber/cavity as shown in FIG. 8. Alternatively, the chamber may be configured with a plurality of sub-chambers 87 as shown in FIG. 9. These sub-chambers 87 may be formed by one or more baffles 89 configured within the chamber between the components 64 and 68. These baffles 89 may prevent noise waves from spinning within the chamber 86. One or more of the baffles 89 may divide the chamber 86 into completely fluidly separate sub-chambers. Alternatively, one or more of the baffles 89 may partially divide the chamber into interconnected sub-chambers.

With the configuration of the acoustic panel 62 and back cover 64 as described above, the second region 86B of the chamber 86 may be positioned adjacent to the acoustic panel 62 and its core 70. For example, the second region 86B of the chamber 86 may radially overlap and may be radially aligned with the core 70 and its cavities 80. In this manner, the acoustic panel structure 60 is configured to position at least the second region 86B of the chamber 86 in a region of the nacelle 58 or inner fixed structure 50 which may otherwise by unoccupied. Thus, the acoustic panel structure 60 may be configured to utilize otherwise unoccupied (e.g., empty) region(s) of the nacelle 58 and inner fixed structure 50 to form/hold the chamber(s) 86. The acoustic panel structure 60 of the present disclosure therefore may position at least a portion of the chamber 86 axially and/or circumferentially adjacent the acoustic panel 62, which enables a more compact nacelle 58 and inner fixed structure 50 while still providing deep noise attenuation. Alternatively, the acoustic panel structure 60 may utilize unoccupied space behind the acoustic panel 62 to position the entire chamber (s) 86 as illustrated in FIG. 7.

The acoustic panel structure 60 may be constructed from various suitable materials. Examples of such materials may include metals such as titanium, aluminum, etc. Other examples of such material may include composites such as fiberglass, carbon fiber, aramid (e.g., Kevlar) fiber within a polymer matrix, which may be a thermoplastic or thermoset material. The acoustic panel structure 60 may also be constructed from a mixture of materials; e.g., the acoustic panel 62 may be a carbon fiber composite whereas the back cover 64 may be metal. Of course, the present disclosure is not limited to the foregoing exemplary constructions, nor the exemplary acoustic panel materials described above. More particularly, various other types of acoustic panel types and configurations are known in the art, and the present disclosure is not limited to including any particular ones thereof.

In some embodiments, the acoustic panel structure 60 may be designed and manufactured generally together as a single integral unit. In other embodiments, an engine nacelle and/or inner fixed structure may be retrofitted with a back cover 64 to provide that engine nacelle and/or inner fixed structure with an acoustic panel structure 60 according to the present disclosure. In such embodiments, a region of a back sheet 68 of the acoustic panel 62 may be perforated using, for example, a laser or any other machining device. The back cover 64 may then be positioned as described above and attached to the acoustic panel 62. The back cover 64, for example, may be mechanically fastened to the acoustic panel 62 using one or more blind rivet or any other type of fastener. In addition or alternatively, the back cover 64 may be welded, brazed, adhered and/or otherwise bonded to the acoustic panel 62.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. An acoustic panel structure for an aircraft propulsion system, comprising:
    a first sheet configured with a first perforated region and a first non-perforated region;
    a second sheet configured with a second perforated region;
    a core configured with a plurality of cavities between the first perforated region and the second perforated region; and
    a third sheet configured to form a chamber, a radial outer periphery of the chamber bounded by the second perforated region and the first non-perforated region and not by a perforated region of the first sheet;
    wherein the first sheet is configured to partially form an inner radial boundary of a bypass gas path through the aircraft propulsion system, and wherein the first sheet is radially outboard of the second sheet and the third sheet.

2. The acoustic panel structure of claim 1, wherein the core is radially between the first sheet and the second sheet, and the chamber radially overlaps the core.

3. The acoustic panel structure of claim 1, wherein the core is radially between the first sheet and the second sheet, and a portion of the chamber is radially aligned with the core.

4. The acoustic panel structure of claim 1, wherein the core is radially between the first sheet and the second sheet, and a portion of the chamber is circumferentially next to the core.

5. The acoustic panel structure of claim 1, wherein the core is vertically between the first sheet and the second sheet, and a portion of the chamber is axially next to the core.

6. The acoustic panel structure of claim 1, wherein the second sheet is configured with a second non-perforated region, and the core is configured with a plurality of second cavities between the first perforated region and the second non-perforated region.

7. The acoustic panel structure of claim 1, wherein the core is connected between the first sheet and the second sheet, and the third sheet is connected to the first sheet and the second sheet.

8. The acoustic panel structure of claim 7, wherein the core is bonded to the first sheet and the second sheet.

9. The acoustic panel structure of claim 7, wherein the third sheet is bonded to the first sheet and/or the second sheet.

10. The acoustic panel structure of claim 7, wherein the third sheet is mechanically fastened to the first sheet and/or the second sheet.

11. The acoustic panel structure of claim 1, wherein a first portion of the chamber fluidly couples a second portion of the chamber with at least some of the cavities, and a radial thickness of the first portion of the chamber is less than a radial thickness of the second portion of the chamber.

12. An assembly for an aircraft propulsion system, comprising:
a nacelle for the aircraft propulsion system, the nacelle comprising:
an acoustic panel configured with a plurality of cavities fluidly coupled and vertically between a plurality of first perforations and a plurality of second perforations, the acoustic panel comprising a first sheet, a second sheet and a core between the first sheet and the second sheet; and
a back sheet connected to the acoustic panel;
wherein a chamber is between the acoustic panel and the back sheet, the chamber vertically overlaps the acoustic panel, and the chamber is bounded by a non-perforated region of the first sheet and not by any perforated region of the first sheet; and
wherein the second sheet is between the first sheet and the back sheet.

13. The assembly of claim 12, wherein the acoustic panel is a composite bond panel.

14. An assembly for an aircraft propulsion system, comprising:
an inner fixed structure for the aircraft propulsion system, the inner fixed structure comprising:
an acoustic panel configured with a plurality of cavities fluidly coupled and vertically between a plurality of first perforations and a plurality of second perforations, the acoustic panel comprising a first sheet, a second sheet and a core between the first sheet and the second sheet; and
a back sheet connected to the acoustic panel;
wherein a chamber is between the acoustic panel and the back sheet, the chamber vertically overlaps the acoustic panel, and the chamber is only bounded by a non-perforated region of the first sheet; and
wherein the second sheet is between the first sheet and the back sheet.

15. The assembly of claim 14, wherein the inner fixed structure partially forms a bypass gas path through the aircraft propulsion system, and the acoustic panel partially forms an inner radial boundary of the bypass gas path.

16. The assembly of claim 12, wherein the nacelle at least partially forms a bypass gas path through the aircraft propulsion system, and the acoustic panel partially forms an inner boundary of the bypass gas path.

17. The acoustic panel structure of claim 1, wherein all of the first sheet that bounds the chamber further fluidly separates the chamber from the bypass gas path.

18. The assembly of claim 14, wherein is back sheet is arranged radially within the acoustic panel.

* * * * *